United States Patent [19]
Levine et al.

[11] 4,302,885
[45] Dec. 1, 1981

[54] NORTH FINDER WITH OPTICAL TRANSFER PROVISION

[75] Inventors: Seymour Levine, Wood Land Hills, Calif.; Willis G. Wing, Glen Head, N.Y.

[73] Assignee: Sperry Corporation, New York, N.Y.

[21] Appl. No.: 149,087

[22] Filed: May 12, 1980

[51] Int. Cl.³ .............................................. G01C 19/38
[52] U.S. Cl. .................... 33/228; 33/275 G; 33/285; 350/102; 356/149
[58] Field of Search .................... 33/275 G, 324, 228, 33/285, 325, 326, 327; 356/148, 149, 138, 153; 350/102

[56] References Cited

U.S. PATENT DOCUMENTS

| | | | |
|---|---|---|---|
| 3,098,306 | 7/1963 | Dinter, Jr. | 33/275 G |
| 3,567,326 | 3/1971 | Smith-Vaniz | 356/153 X |
| 3,936,947 | 2/1976 | Knapp | 33/275 G |

FOREIGN PATENT DOCUMENTS 2263460 7/1973 Fed. Rep. of Germany ...... 350/102

*Primary Examiner*—William D. Martin, Jr.
*Attorney, Agent, or Firm*—Howard P. Terry

[57] ABSTRACT

A portable gyroscopic compass surveying device includes means for rapidly aligning the apparatus with respect to geographic north, the north finder itself being operated apart from the associated theodolite on its own low mount. The transfer of the azimuth reference data is accomplished optically by sighting the theodolite telescope on a retro-reflector associated with the north finder. Because the north finder is physically separated from the theodolite, sightings may be made by the theodolite operator while the undisturbed north seeking operation is in process, significantly shortening the total time of operation at each station.

7 Claims, 10 Drawing Figures

NORTH FINDER WITH OPTICAL TRANSFER PROVISION

BACKGROUND OF THE INVENTION

1. Field of the Invention

The invention relates to portable gyroscopic compass devices of the kind adapted for surveying purposes and more particularly relates to portable north-seeking gyroscopic surveying devices including means for rapidly aligning the apparatus with respect to geographic north.

2. Description of the Prior Art

Prior art gyrocompass devices useful in north-seeking systems for surveying applications generally fall into two classes: (1) those which are physically combined with a theodolite so that there is direct mechanical means for transfer of the north reference to the theodolite azimuth circle and (2) those which are physically separate from the theodolite so other means must be provided for the transfer of the azimuth reference information. Typical of the former devices are the devices presented in the W. G. Wing U.S. Pat. Nos. 4,033,045, issued July 5, 1977 for a "Portable Surveying Gyrocompass Apparatus", and 4,109,391, issued Aug. 29, 1978 for a "Portable Surveying Compass With Flux Valve and Gyrocompass Alignment Modes", both assigned to Sperry Corporation. Also of general interest is the sensitive element system disclosed in the T. R. Quermann U.S. Patent Application Ser. No. 67,842, filed Aug. 20, 1979 for a "Gyroscope Indexing Drive Mechanism" and assigned to Sperry Corporation; this mechanism appears in a north seeker designed for operation apart from a theodolite.

Three problems arise with integrated systems of the class (1) kind. Inspection of the aforementioned Wing patents, for example, shows that a standard, off-the-shelf theodolite cannot be used in the integrated device. Incorporation of the gyroscopic sensitive element within a theodolite requires significant revision of the latter, and vice versa. Accordingly, it is apparent that a procedure using a directly purchasable theodolite has evident advantages.

The class (1) instrumentation has further problems when in operation. Clearly, the theodolite must be undisturbed throughout the north-finding operation. As a consequence, the time used in making a first survey operation at a representative station is the sum of the time needed to set up the instruments, the actual north-finding time, and the time used for actual theodolite sightings and readings. Since the steps are taken in sequence, the total time can be significant. Furthermore, it is normally the practice to operate the theodolite on a relatively high tripod, but such a configuration can result in significant wind-induced disturbances which would undesirably reduce the accuracy of any north finder mounted on the theodolite.

In the instance of class (2) systems, the prior art is known to have used optical transfer methods, but has never provided a convenient means of alignment of the theodolite with respect to the north seeker. The prior art systems are not practical unless two operators are available, one of whom will be unnecessary in the remainder of the operation at a selected station.

SUMMARY OF THE INVENTION

The shortcomings of the prior art are overcome according to the invention by operating the north finder apart from the theodolite, on its own low mount. The transfer of the azimuth reference is accomplished optically by sighting the theodolite telescope on a retro-reflector associated with the north finder that has been accurately aligned to the north finder.

DESCRIPTION OF THE PREFERRED EMBODIMENTS

Figure 1:
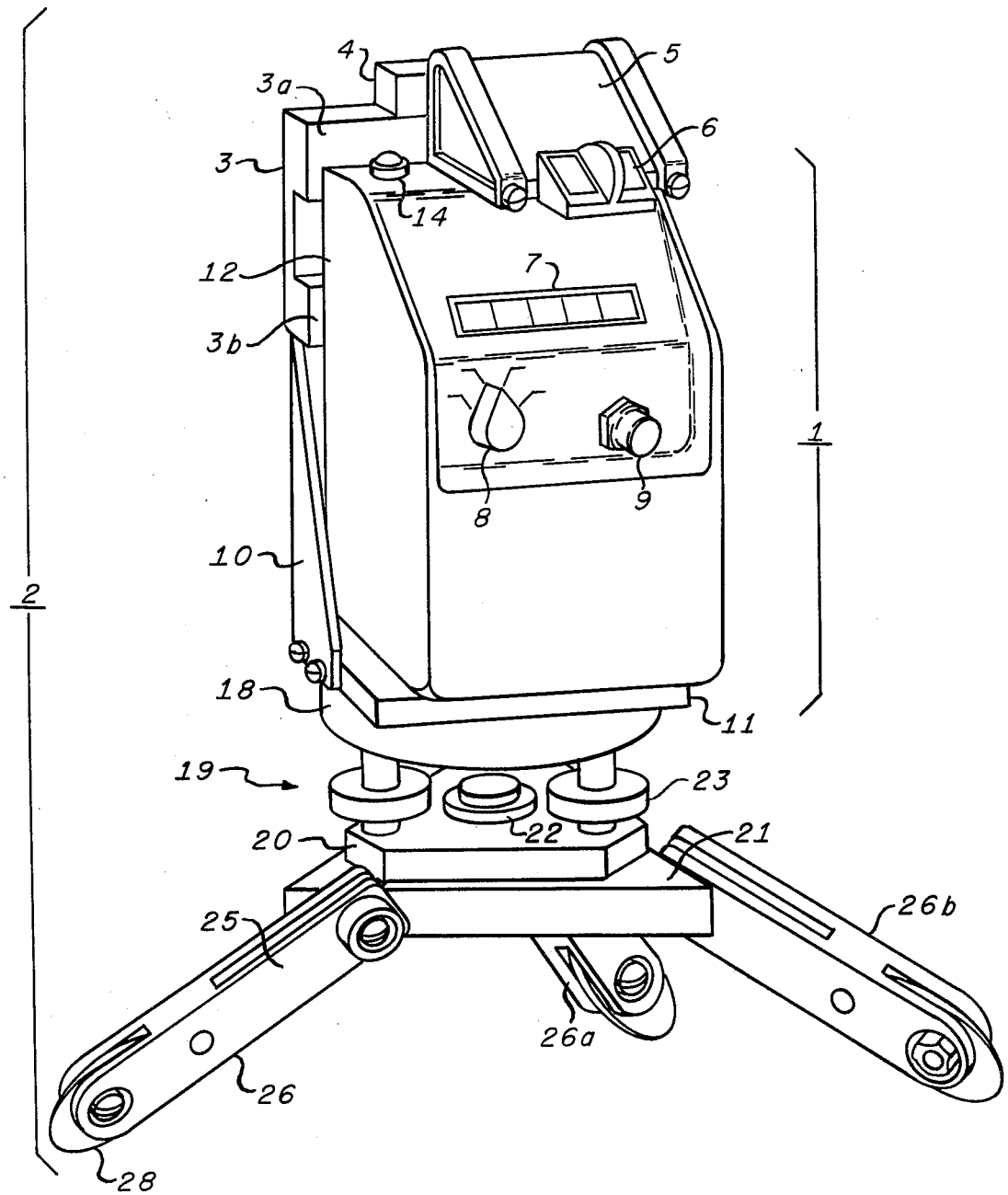
FIG. 1 is a perspective view of the invention.

FIG. 1 illustrates a north finder gyroscopic system 1 which, though packaged in a quasi-rectangular housing, may be generally similar in structure and operation to known north finding gyroscopic devices, including those of the aforementioned Wing patents and Quermann patent application, but with significant distinctions, including the primary distinction that the novel apparatus is supported independently of its cooperating theodolite. According to the invention, north finder 1 is now supported by an independent mount 2 to which north finder 1 is securely attached, as will be described. While mount 2 will be referred to for convenience as a mount, it has functions other than the mere support of north finder 1, as will be described. For example, the mount 1 includes:

(a) tripod-like support legs 26, 26a, 26b for rough level adjustment, (b) elements 20, 21, 22 permitting accurate azimuth adjustment of the upper portion of mount 2 and of north finder 1 and the locking of the azimuth axis, (c) a level adjusting means 19 for accurate level adjustment, (d) a bracket-like support element 3, 10, 11 18 to which north finder 1 is affixed, (e) a sensitive spirit level 4 operating about the horizontal axis through the retro-reflector and sighting elements, (f) the retro-reflector 5 precisely aligned in azimuth with the north finder mounting surface, and (g) the sighting element 6 which assists in orientation of the north finder in azimuth so that it points toward the theodolite.

The structure and operation of items (a) through (g) remain to be discussed in detail.

Figure 2:
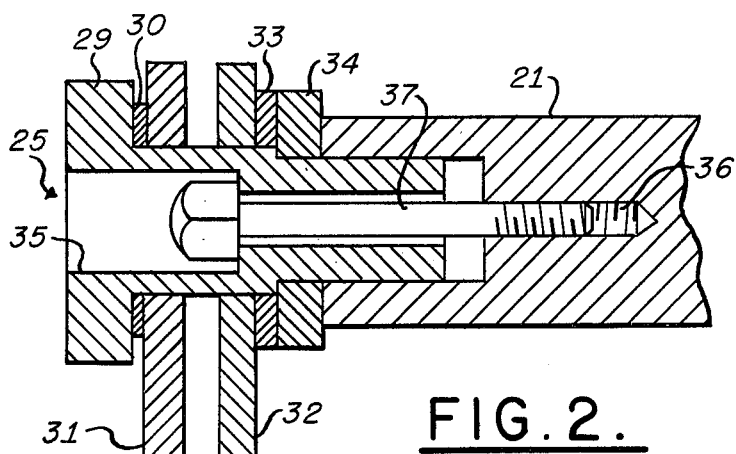
FIG. 2 is a cross-section view of one of the three support legs of the apparatus of FIG. 1.

Referring to FIGS. 1 and 2, each aluminum tripod leg 26, 26a, 26b is pivoted, as at 25, near corners of an equal sided triangular aluminum plate 21 by a machine screw 37 passing into a threaded bore 36 in plate 21. Machine screw 37 holds a stainless steel bushing 35 firmly in place within a second bore in plate 21 concentric therewith. Between an end surface of plate 21 and the inner face of an outer enlargement 29 of bushing 35 are disposed a washer 34 and the parallel arms 31, 32 of the tripod leg 26, along with a friction mechanism. On opposite sides of arms 31, 32 are disposed washers 30, 33 made of a conventional surface friction-exhibiting material. The distances between the inner faces of enlargement 29 and of washer 34 are arranged so that a slight compressive force is exerted on arms 31, 32, this force being adequate to exert holding forces upon the friction surfaces of washers 30, 33. In this way, the angle between leg 26 and plate 21 remains fixed, once manually set, during operation of the apparatus, but may yet be readily enough manually adjusted by the operator to effect rough level adjustment of the instrument.

The remainder of each leg assembly includes a region 45 where arms 31, 32 make common contact and are fastened by a conventional fastener such as pin 46. Arms 31, 32 are then further extended to form a pocket 47 in which resides a generally disk-shaped element 28 that contacts the surface on which the north finder system is to be set up. Stainless steel disk element 28 has an arcuate V-shaped surface as seen in FIGS. 1 and 2 adapted to provide non-slip engagement of the earth's or other surface. Legs 26, 26a, 26b may be pivoted over a wide range of angles; in fact, the legs may be moved into parallel relation with the triangular aluminum plate 21 so that the latter fully furnishes the direct support of the apparatus, such as directly upon a reasonably level pavement or floor.

Figure 3:
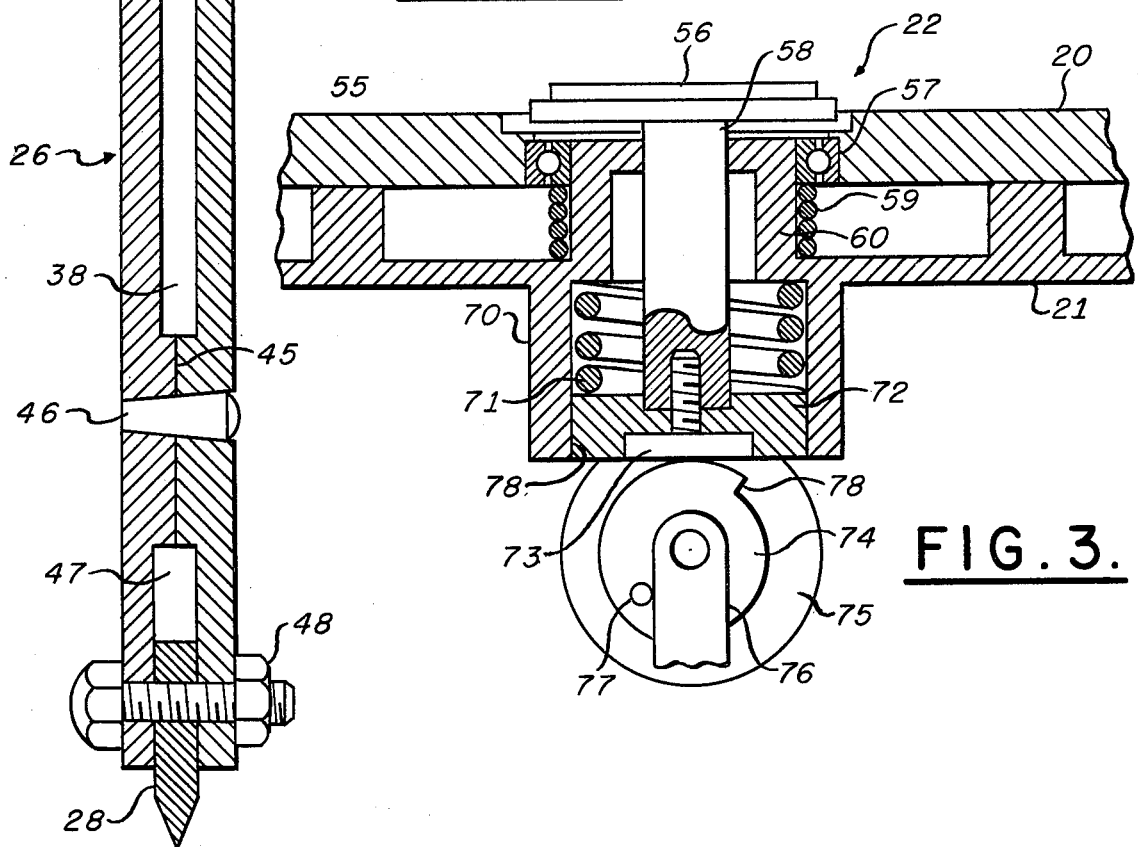
FIG. 3 is a cross-section view of a portion of the azimuth adjustment portion of FIG. 1.

Referring to FIGS. 1 and 3, a means 22 is provided for rotating, about a nominally vertical axis, the plate 20 with respect to triangular plate 21 and for locking the plates 20, 21 in selected relative orientations, thus permitting the adjustment in azimuth of the upper part of mount 2 and of north finder 1. As shown particularly in FIG. 3, plate 21, to which tripod legs 26, 26a, 26b are attached, has an upwardly extending hollow boss 60 and a larger downwardly extending hollow boss 70. Boss 60 accommodates a friction-free bearing 57 upon which plate 20 may be rotated, bearing 57 being held in place by a cylindrical spring 59. Extending through the capped end of boss 60 is a nominally vertical stainless steel rod 58 for which a free bearing surface is thus provided. In the lower end of rod 58 in boss 70 is disposed a disk 72 which has a free bearing surface at its periphery relative to the lower inner surface 78 of boss 70. Rod 58 and disk 72 are made integral by a machine screw 73 whose hardened outer surface is in contact with cam 74. The upper part of rod 58 is integral with a disk 56 having a periphery overlapping an undercut surface of plate 20.

As noted, screw 73, disk 72, rod 58, and disk 56 may be translated in a vertical direction with respect to boss 70 and plate 21. When the assembly is moved upward against the force of spring 71, disk 56 is in the position shown in the drawing, and the operator can rotate plate 20 freely. A manually operable cam 74 and a control knob 75 are provided for determining the vertical position of disk 56. The cam (74) surface bears against the face of screw 73 and cam 74 is journalled in an extension 76 of plate 21. A stop 77 is supplied so that the cam 74 cannot be rotated so far that there is interplay with the cam step 78. As noted, it is seen that the cam 74 has a first state in which plate 20 may be easily turned and a second state in which disk 56 is urged by spring 71 internal of boss 70 to prevent plate 20 from turning.

Above plate 20 and cooperating therewith is a triad arrangement 19 of conventional nature for precise levelling of the bracket-like support 3, 10, 11, 18 and the north finder 1 attached thereto. In fact, levelling device 19 comprises three manually operable screws, such as screw 23, threaded into cooperating threaded holes in plates 18 and 20 in 120° spaced apart relation. This assembly is readily purchased from manufacturers of surveying equipment and therefore need not be further described here.

The bracket-like element 3, 10, 11, 18 to which north finder 1 is to be attached in supported relation will next be considered from FIG. 1; it consists at least of a base or shelf plate 11 affixed to plate 18 in unitary manner and respective triangular and vertical extension parts 10 and 3 which will be further discussed in connection with FIGS. 6 through 9. On top of the vertical extension part 3 is disposed a conventional bubble spirit level 4 seen also at the right side of FIG. 6. Retro-reflector 5 is particularly sensitive to orientation about the fore-aft horizontal axis 110 of FIG. 6 so that the bull's eye level 14 used in preliminary levelling of the north finder 1 is not fully adequate for fine levelling about axis 110 and the more sensitive level 4 is therefore supplied.

Figure 5:
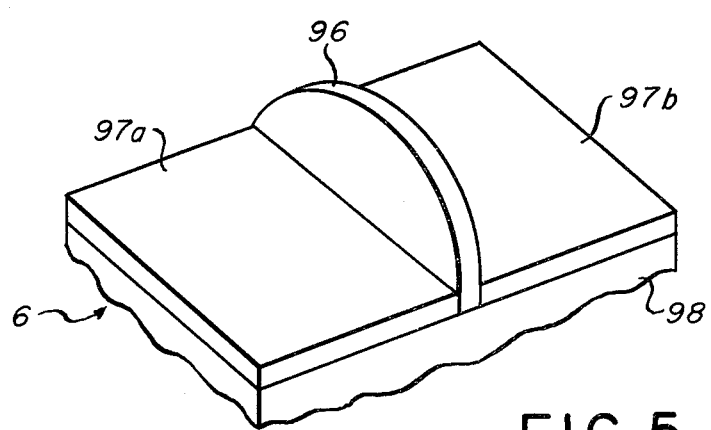
FIG. 5 is a perspective view of the sighting elements of FIGS. 1 and 4.
Figure 4:
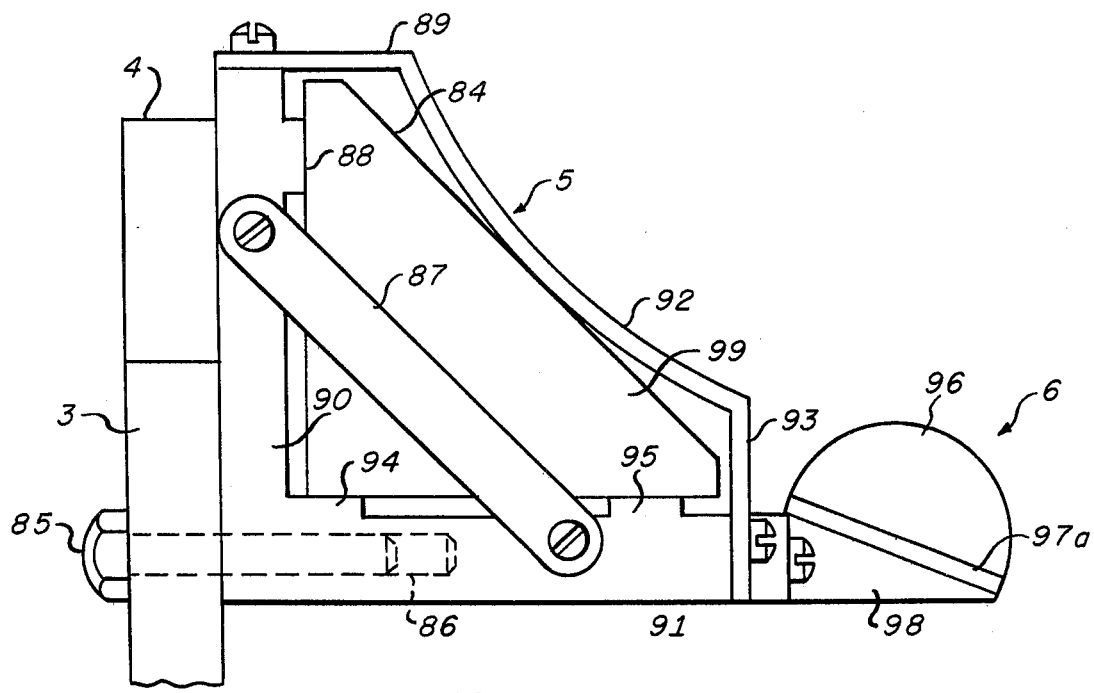
FIG. 4 is an end view of the retro-reflector and sighting elements of FIG. 1.

Supported at the face of vertical extension part 3 of bracket 3, 10, 11, 18 in non-contacting overlying relation with north finder 1 is a dual function element including a retro-reflector 5 in the form of a right angle prism and a sighting element 6 as seen in FIGS. 1, 4, and 5. Particularly as seen in FIG. 4, retro-reflector 5 is affixed to vertical extension 3 by fasteners such as machine screw 85 extending into a threaded bore 86 in a base plate part 91 having also a vertical plate 90 formed integrally with base 91. Part 90 is supplied with a machined horizontally disposed boss 88, while the base part 91 is equipped with two similar parallel machined bosses 94, 95. An optical quality isosceles prism 99 with 90, 45, and 45 degree corners is seated as shown firmly against the faces of bosses 88, 94, 95. As illustrated, it will be seen that the hypotenuse face 84 of prism 99 is normally disposed about 45° to the horizontal and that prism 99 is held firmly against the three boss faces by the force at individual contacting points of a pair of mainly arcuate springs 92 each having flat extensions 89, 93. Extension 89 is bolted to an upper face of vertical plate 90, while extension 93 is bolted to a front face of base plate part 91. Two spring clamps such as clamp 92 are employed, one at each end of prism 99. Also at each end of prism 99 are disposed third and fourth diagonal spring clamps such as clamp 87, which latter is fastened at its ends to plates 90, 91, respectively. Each spring clamp 87 contacts opposed passive faces of prism 99 to hold it in fixed centralized position. It is seen that prism 99 is of relatively large size providing for greater azimuth tolerance. The use of the right angle prism makes elevation motion of the prism unnecessary.

Affixed to the outer face of the retro-reflector base plate 31 is a sighting element seen in FIGS. 1, 4, and 5. This simple device is essential to the operation of the invention and includes a mirror support 98 fastened to the frontal edge of plate 91 for supporting a pair of similar front metallized mirror surfaces 97a, 97b at an acute angle or an angle, for instance, of about 25.5° with respect to the horizontal plane. A semi-circular opaque divider 96, with dull light-diffusing exposed surfaces, is situated on support 98 between mirrors 97a, 97b perpendicular to the plane common to the mirrors.

Figure 6:
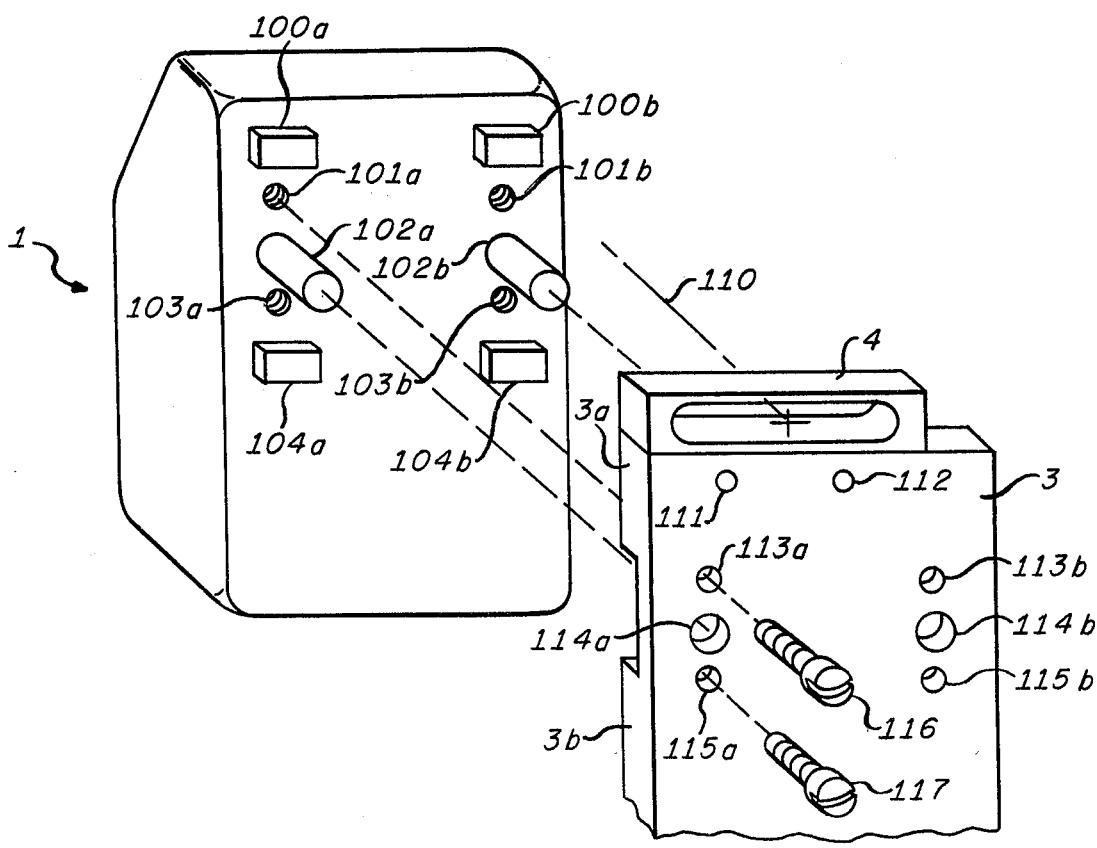
FIG. 6 is a perspective view illustrating one manner of attachment of the north finder module to the novel mounting system.

It will be understood by those skilled in the art that the north finder 1 must be accurately and reliably affixed in the mount 2 to the vertical element 3 of the bracket-like element 3, 10, 11, 18. FIG. 6 shows one way in which such attachment may be accomplished. For example, vertical extension 3 may include a pair of parallel elongate machined bosses 3a, 3b against which north finder 1 may be held, in part, through the agency of a plurality of contacting bosses 100a, 100b and 104a, 104b which respectively contact the faces of bosses 3a, 3b near their ends. Pins 102a, 102b projecting from north finder 1 may be inserted in cooperating bores 114a, 115b of extension 3. Assembly is finally completed by machine screws such as screws 116, 117, projecting through the respective bores 113a, 113b and 115a, 115b of extension 3 into respective threaded bores 101a, 101b and 103a, 103b provided at the back of the north finder 1.

Figure 7:
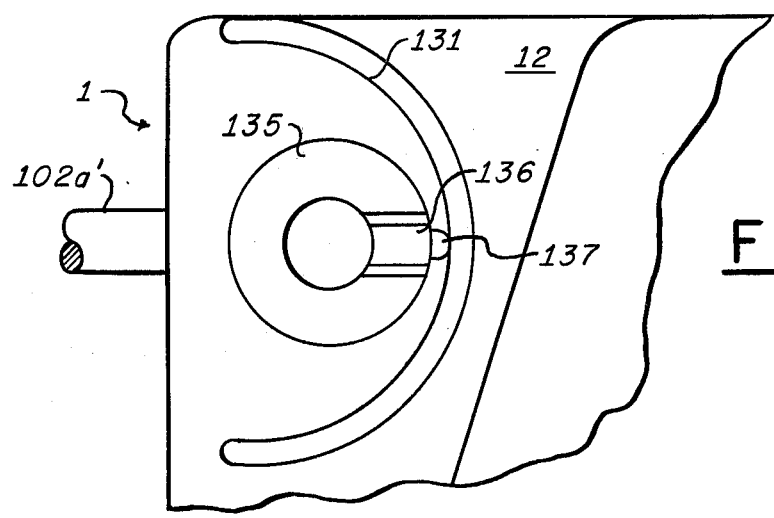
FIG. 7 is an elevation view of a preferred means of attachment.
Figure 8:
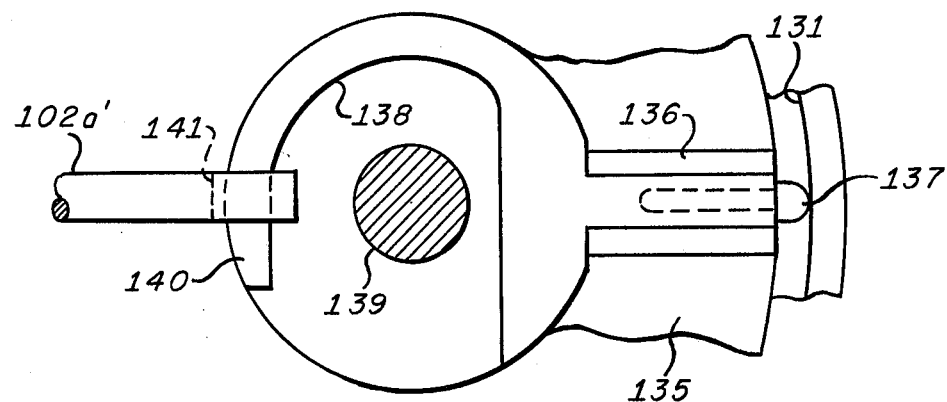
FIG. 8 is a view of the opposite side of the attachment device of FIG. 7.
Figure 9:
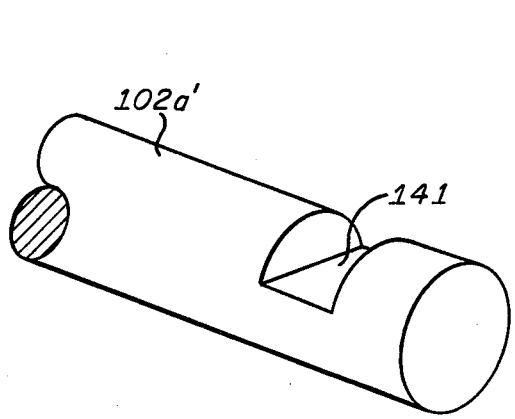
FIG. 9 is a perspective view of a detail of FIG. 8.

With a general understanding of the fastening system of FIG. 6 in mind, reference may now be had to a preferred fastening system as shown in FIGS. 7, 8, and 9. The several machine screws of FIG. 6 are no longer required, and the simple pins 102a, 102b are revised and now extend from vertical extension plate 3. A clamping control knob 135 with handle 136 is located at region 12 (FIGS. 1 and 7) near the top of the north finder casing. As in FIGS. 8 and 9, it is clear that counter-clockwise rotation of knob 135 will control the degree of insertion of the tapered circular cam body 138 into the slot 141 in the outer end of a pin 102a' projecting from the vertical plate extension 3. Since shaft 138 is journalled in the north finder casing, the progressive circular movement of the cam end 140 into slot 141 pulls pin 102a' radially toward shaft 138. Clockwise rotation of knob 135 removes cam end 140 from slot 141, effecting easy release of the north finder 1 from mount 2. Opposed back top corner regions 12, 12' of the north finder are provided with companion clamping systems such as generally described in FIGS. 7, 8, and 9, which cooperate with respective pins 102a', 102b' supplied on the mount 1 in locations corresponding to holes 114a, 114b of FIG. 6. A spring-urged pin with a bearing head 137 is radially slidable within a bore in handle 136 and contacts the inner surface of an arcuate surface 131 integral with the north finder casing. The contact between head 137 and the inner surface 131 aids in insuring that the rotatable knob 135 will remain in its manually established position until friction forces are manually overcome over an operating range. In general, the arrangement of FIGS. 7, 8, and 9 allows rapid attachment of the north finder 1 to the mount 2 and vice versa.

With the north finder operated apart from the theodolite on its own mount, the transfer of azimuth reference data is done optically by sighting the theodolite telescope on retro-reflector prism 99 which has been accurately aligned with respect to the north finder; in this manner, no modification of the commercially available theodolite is needed, through a standard auto-collimating eye-piece is needed.

Figure 10:
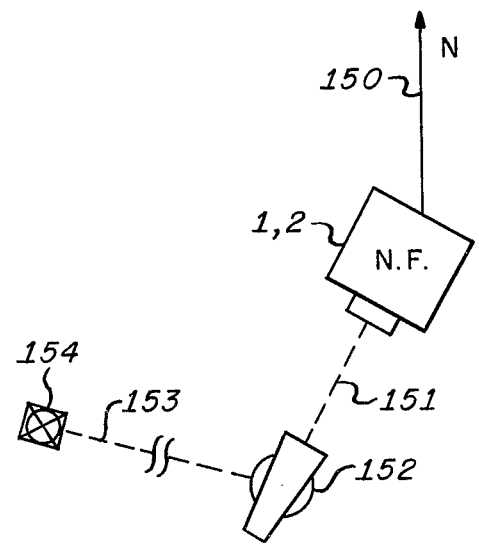
FIG. 10 is a plan view of the disposition of the apparatus when in use in the field.

In operation, north finder assembly 1, 2 (FIG. 10) is positioned in the general vicinity of the selected location of theodolite 152 and the theodolite is levelled and pointed in the general direction 151 of the north finder. The north finder assembly 1, 2 is placed on the ground or other convenient surface at the selected location; rough levelling is accomplished using manual adjustment of the angles of legs 26, 26a, 26b. The north finder assembly is then more precisely levelled using the fine adjustment screws 23 of level adjusting means 19 while observing the bull's eye spirit level 14. The azimuth axis of the mount 2 is unlocked by operating cam 74 of FIG. 3, raising rod 58 and releasing plate 20 to be moved manually in azimuth. While looking generally downwardly from behind the instrument toward the surfaces of mirrors 97a, 97b, the operator rotates plate 20 and consequently the assembly mounted upon it. With continued rotation, the assembly finally reaches the azimuth angle where the operator sees a reflection of the theodolite (152) image. At the precise angle at which the half-disk 96 splits the image of the theodolite objective lens, the north finder assembly is properly aligned and is locked in azimuth. It is found in practice that this arrangement allows rapid orientation of the north finder to an accuracy of about 0.5°, which is sufficient to allow the operator quickly to find the reflected illuminated cross hair image as viewed by him in the theodolite telescope. Then, the operator locks the upper and lower parts of the north finder assembly in azimuth by rotating cam 74 so as to lower rod 58 and to engage in locked relation the adjacent surfaces of plates 20, 21 under the influence of spring 71. Next, the level of assembly 1, 2 is precisely trimmed using screws 23 to center the critical axis spirit level 4 and to obtain final levelling of the north finder about the second or less-critical axis using bull's eye spirit level 14.

Now, there need be no further delay in starting the gyroscope and other parts of north finder 1, as by using suitable controls 8, 9 (FIG. 1). The north finder 1 is electrically energized from a source (not shown) and can proceed to perform its role while independent operations take place simultaneously. The focus of the telescope of theodolite 152 is adjusted, using the illuminated auto-collimating eye-piece cross hairs, so that a clear image of the retro-reflector 99 is formed in the operator's eye. Next, the focal length setting of theodolite 152 is doubled until the objective lens of the theodolite is clearly imaged in the telescope eye-piece. Any minor azimuth pointing error of the telescope of theodolite 152 is then corrected by the operator in the usual manner. Slow increase of the focal length with the cross hairs illuminated will ultimately bring the illuminated image of the cross hairs into sharp view in the eye of the theodolite operator to allow final accurate azimuth setting of the theodolite. Now, the azimuth orientation of the theodolite optical axis is just equal to that of north finder 1, 2 both falling along axis 151.

The azimuth scale of theodolite 152 is read and the theodolite is trained in azimuth to a new axis 153 intersecting an object 154 to be surveyed, as in normal practice. The azimuth angle of north finer system 1, 2 will be read out in a conventional manner on display 7 at any convenient time following completion of its north finding cycle, so that the direction 150 toward north is now known and so that the direction of object 154 with respect to north is readily computed.

Because the north finder is now spaced apart from the theodolite, sightings are taken with the theodolite while the north finding process is still taken place and the optical azimuth transfer can take place at a time significantly earlier than ordinary. Even with a north finder capable of very rapid north determination, its separation from the theodolite shortens the total time for each operation. In some circumstances, increased accuracy may be provided by use of the multiple or iterative cycling of the north finder as taught in the aforementioned Wing patents. In addition, accuracy and confidence are enhanced because the mount for the north finder can be quite low, making it relatively immune to wind disturbances.

While the invention has been described in its preferred embodiments, it is to be understood that the words that have been used are words of description rather than of limitation and that changes within the purview of the appended claims may be made without departing from the true scope and spirit of the invention in its broader aspects.

What is claimed is:

1. Gyroscopic surveying means including:
   north seeker gyrocompass means,
   support means including means for levelling said north seeker gyrocompass means and means for selectively adjusting said north seeker gyrocompass means in azimuth,
   sighting means disposed in fixed angular relation upon said north seeker gyrocompass means adapted for viewing the objective lens of a vicinal theodolite telescope having adjustability at least in azimuth, said sighting means including,
   first and second coplanar mirror means, and
   opaque divider means disposed at right angles between said first and second coplanar mirror means,
   said coplanar mirror means being fixedly disposed at an acute angle with respect to the normally horizontal plane, and
   retro-reflector means disposed in said same fixed angular relation upon said north seeker gyrocompass means viewable by said theodolite telescope permitting the azimuth axis of said theodolite telescope to be made substantially coincident with the active axis of said retro-reflector means.

2. Gyroscopic surveying means including:
   north seeker gyrocompass means,
   support means including means for levelling said north seeker gyrocompass means and means for selectively adjusting said north seeker gyrocompass means in azimuth,
   theodolite means spaced separately from said north seeker gyrocompass means and having telescope means orientable toward said north seeker gyrocompass means,
   sighting means disposed in fixed angular relation upon said north seeker gyrocompass means for viewing the objective lens of said telescope means upon appropriate adjustment of the azimuth of said north seeker gyrocompass means, said sighting means including,
   first and second coplanar mirror means, and
   opaque divider means disposed at right angles between said first and second coplanar mirror means,
   said coplanar mirror means being fixedly disposed at an acute angle with respect to the normally horizontal plane, and
   retro-reflector means fixedly aligned in azimuth with said sighting means viewable by said telescope means permitting the azimuth axis of said telescope means to be made precisely coincident to the active axis of said retro-reflector means.

3. Apparatus as described in claims 1 or 2 wherein said means for levelling said north seeker gyrocompass means includes:
   adjustable tripod means, and
   plural adjustable screw means for controlling the position of said north seeker gyrocompass means about a normally vertical axis.

4. Apparatus as described in claims 1 or 2 wherein said means for selectively adjusting said north seeker gyrocompass means in azimuth includes means interposed between said adjustable tripod means and said plural adjustable screw means for clamping same in fixed azimuth relation.

5. Apparatus as described in claims 1 or 2 wherein said acute angle is substantially 22.5°.

6. Apparatus as described in claims 1 or 2 wherein said retro-reflector means includes an isosceles triangular optical prism having a broad optically viewable face.

7. The method of operating a gyroscopic surveying means including north seeker gyrocompass means having support means for levelling said north seeker gyroscope means and means for selectively adjusting said north seeker gyrocompass means in azimuth, theodolite means spaced apart from said north seeker gyrocompass means and having telescope means orientable toward said north seeker gyrocompass means, sighting means disposed in fixed angular relation upon said north seeker gyrocompass means for viewing the objective lens of said telescope means and having inclined first and second coplanar mirror means with opaque dividing means disposed at right angles between said inclined first and second coplanar mirror means, and retro-reflector means fixedly aligned in azimuth with said sighting means upon said north seeker gyroscopic compass means viewable by said telescope means, said method of operating including the steps of:
   setting up and levelling said theodolite with its telescope oriented in the general direction of the site of said north seeker gyrocompass means,
   setting up and levelling said north seeker gyrocompass means,
   unlocking said north seeker gyrocompass means for movement about its vertical axis,
   rotating said north seeker gyroscope means about said vertical axis while examining the field of view of said sighting means,
   locking said north seeker gyroscopic compass means for preventing further azimuth movement of said north seeker gyroscopic compass when said dividing means of said sighting means splits the image of the objective lens of said telescope means on said inclined first and second coplanar mirror means,
   placing said north seeker gyroscopic compass means into north seeking operation,
   focussing said telescope means to form a clear image of said retro-reflector means in the telescope eye piece,
   doubling the focal length of said telescope means until an image of the objective lens is clearly imaged in the telescope eye piece, and
   correcting any minor azimuth error in the pointing angle of said telescope whereby the reference angle of the telescope with respect to true north is determined by inspection of the north read-out of said north seeker gyroscopic means.

* * * * *